United States Patent
Delaney et al.

(10) Patent No.: US 10,911,403 B1
(45) Date of Patent: Feb. 2, 2021

(54) SYSTEMS AND METHODS FOR SECURED MAINTENANCE GATEWAY

(71) Applicant: Rockwell Collins, Inc., Cedar Rapids, IA (US)

(72) Inventors: Kevin Delaney, Cedar Rapids, IA (US); Frédéric Trincal, Toulouse (FR); Patrick J. Morrissey, Cedar Rapids, IA (US); Ryan J. Barnett, Marion, IA (US); Kevin E. Purrington, Raleigh, NC (US); John Kolodick, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 365 days.

(21) Appl. No.: 15/715,031

(22) Filed: Sep. 25, 2017

(51) Int. Cl.
*H04L 29/06* (2006.01)
*H04L 12/725* (2013.01)
*H04L 12/861* (2013.01)
*H04L 29/08* (2006.01)

(52) U.S. Cl.
CPC ............ *H04L 63/02* (2013.01); *H04L 45/304* (2013.01); *H04L 63/0245* (2013.01); *H04L 63/1425* (2013.01); *H04L 49/90* (2013.01); *H04L 67/12* (2013.01)

(58) Field of Classification Search
CPC ............ H04L 63/1425; H04L 63/0245; H04L 45/304; H04L 67/12; H04L 49/90; H04L 63/02
See application file for complete search history.

(56) References Cited

U.S. PATENT DOCUMENTS

| | | | | |
|---|---|---|---|---|
| 5,745,669 A | * | 4/1998 | Hugard ............... | G06F 11/1417 714/3 |
| 6,055,634 A | * | 4/2000 | Severwright .......... | H04L 12/22 713/153 |
| 6,070,246 A | * | 5/2000 | Beser .................. | H04L 29/06 726/2 |

(Continued)

OTHER PUBLICATIONS

"Data Protection Based on Physical Separation: Concepts and Application Scenarios" Lindskog et al. May 2005. (hereinafter Lindskog et al.).*

*Primary Examiner* — Robert B Leung
*Assistant Examiner* — Thomas Ho
(74) *Attorney, Agent, or Firm* — Suiter Swantz pc llo

(57) ABSTRACT

A system includes a first processing circuit, a second processing circuit, and a network interface device. The network interface device includes a first communications interface, a second communications interface, and a filtering engine. The first communications interface is configured to receive first data packets from the first processing circuit and communicate the first data packets for transmission to the second processing circuit via a first network pathway. The second communications interface is configured to receive second data packets from the second processing circuit and communicate the second data packets to the first processing circuit via a second network pathway physically separated from the first network pathway. The filtering engine is configured to determine whether the first data packets satisfy an inspection criteria, and transmit the first data packets to the second processing circuit responsive to determining that the first data packets satisfy the inspection criteria.

19 Claims, 4 Drawing Sheets

(56) References Cited

U.S. PATENT DOCUMENTS

| | | | | |
|---|---|---|---|---|
| 7,016,980 B1* | 3/2006 | Mayer | ................ | H04L 41/0853 709/248 |
| 8,583,769 B1* | 11/2013 | Peters | .................... | G06F 9/541 709/221 |
| 2003/0120955 A1* | 6/2003 | Bartal | ................ | H04L 41/0893 726/4 |
| 2003/0208579 A1* | 11/2003 | Brady, Jr. | ............... | H04L 67/34 709/223 |
| 2004/0063495 A1* | 4/2004 | LeMay | .................. | G07F 17/32 463/42 |
| 2005/0019242 A1* | 1/2005 | Serole | .................. | C01B 13/322 423/325 |
| 2005/0033990 A1* | 2/2005 | Harvey | ................ | H04L 63/105 726/4 |
| 2005/0125652 A1* | 6/2005 | Singer | .................. | G06F 21/572 713/2 |
| 2005/0195735 A1* | 9/2005 | Brady | .................. | G06F 16/273 370/216 |
| 2005/0251552 A1* | 11/2005 | Champel | ............. | H04L 61/2092 709/204 |
| 2006/0032978 A1* | 2/2006 | Matos | ................ | B64D 45/0015 244/118.5 |
| 2007/0260738 A1* | 11/2007 | Palekar | ................ | G06F 21/577 709/229 |
| 2008/0215722 A1* | 9/2008 | Hogaboom | ............. | H04L 43/00 709/224 |
| 2008/0256595 A1* | 10/2008 | Schunter | ................ | G06F 21/57 726/1 |
| 2008/0313746 A1* | 12/2008 | Doi | ...................... | H01L 23/576 726/34 |
| 2009/0144582 A1* | 6/2009 | Li | ........................ | G06F 21/575 714/6.3 |
| 2011/0072119 A1* | 3/2011 | Bronstein | ............ | H04L 41/046 709/222 |
| 2014/0153435 A1* | 6/2014 | Rolette | ............... | H04L 63/0245 370/252 |
| 2018/0307845 A1* | 10/2018 | Eckhardt | ................ | G06F 21/60 |

\* cited by examiner

SYSTEMS AND METHODS FOR SECURED MAINTENANCE GATEWAY

BACKGROUND

The inventive concepts disclosed herein relate generally to the field of avionics systems. More particularly, embodiments of the inventive concepts disclosed herein relate to systems and methods for a secured maintenance gateway.

As aircraft electronics become increasingly connected, many avionics systems are connecting to a gateway and router, such as for sending data off of an aircraft. The preferred interface to the gateway/router is Ethernet because of the speed advantages provided by Ethernet-based systems. However, the Ethernet interface introduces security risks because it is a bi-directional interface, which may allow for communication from low integrity systems to high integrity systems, which may result in security failures during operation, maintenance, or other procedures involving critical electronic communications.

SUMMARY

In one aspect, the inventive concepts disclosed herein are directed to a system. The system includes a first processing circuit, a second processing circuit, and a network interface device. The network interface device includes a first communications interface, a second communications interface, and a filtering engine. The first communications interface is configured to receive first data packets from the first processing circuit and communicate the first data packets for transmission to the second processing circuit via a first network pathway. The second communications interface is configured to receive second data packets from the second processing circuit and communicate the second data packets to the first processing circuit via a second network pathway physically separated from the first network pathway. The filtering engine is configured to determine whether the first data packets satisfy an inspection criteria, and transmit the first data packets to the second processing circuit responsive to determining that the first data packets satisfy the inspection criteria.

In a further aspect, the inventive concepts disclosed herein are directed to an airborne platform. The airborne platform includes a first avionics system including a first processing circuit, an avionics controller including a second processing circuit, and a network interface device. The network interface device includes a first communications interface, a second communications interface, and a filtering engine. The first communications interface is configured to receive first data packets from the first processing circuit and communicate the first data packets for transmission to the second processing circuit via a first network pathway. The second communications interface is configured to receive second data packets from the second processing circuit and communicate the second data packets to the first processing circuit via a second network pathway physically separated from the first network pathway. The filtering engine is configured to determine whether the first data packets satisfy an inspection criteria, and transmit the first data packets to the second processing circuit responsive to determining that the first data packets satisfy the inspection criteria.

In a further aspect, the inventive concepts disclosed herein are directed to a method. The method includes receiving, at a first communications interface of a network interface device, first data packets from a first processing circuit. The method includes communicating, by the first communications interface, the first data packets for transmission to a second processing circuit via a first network pathway. The method includes receiving, at the second communications interface, second data packets from the second processing circuit. The method includes communicating the second data packets to the first processing circuit via a second network pathway physically separated from the first network pathway. The method includes determining, by a filtering engine of the first network pathway, whether the first data packets satisfy an inspection criteria. The method includes transmitting, by the filtering engine, the first data packets from the filtering engine to the second processing circuit responsive to determining that the first data packets satisfy the inspection criteria.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
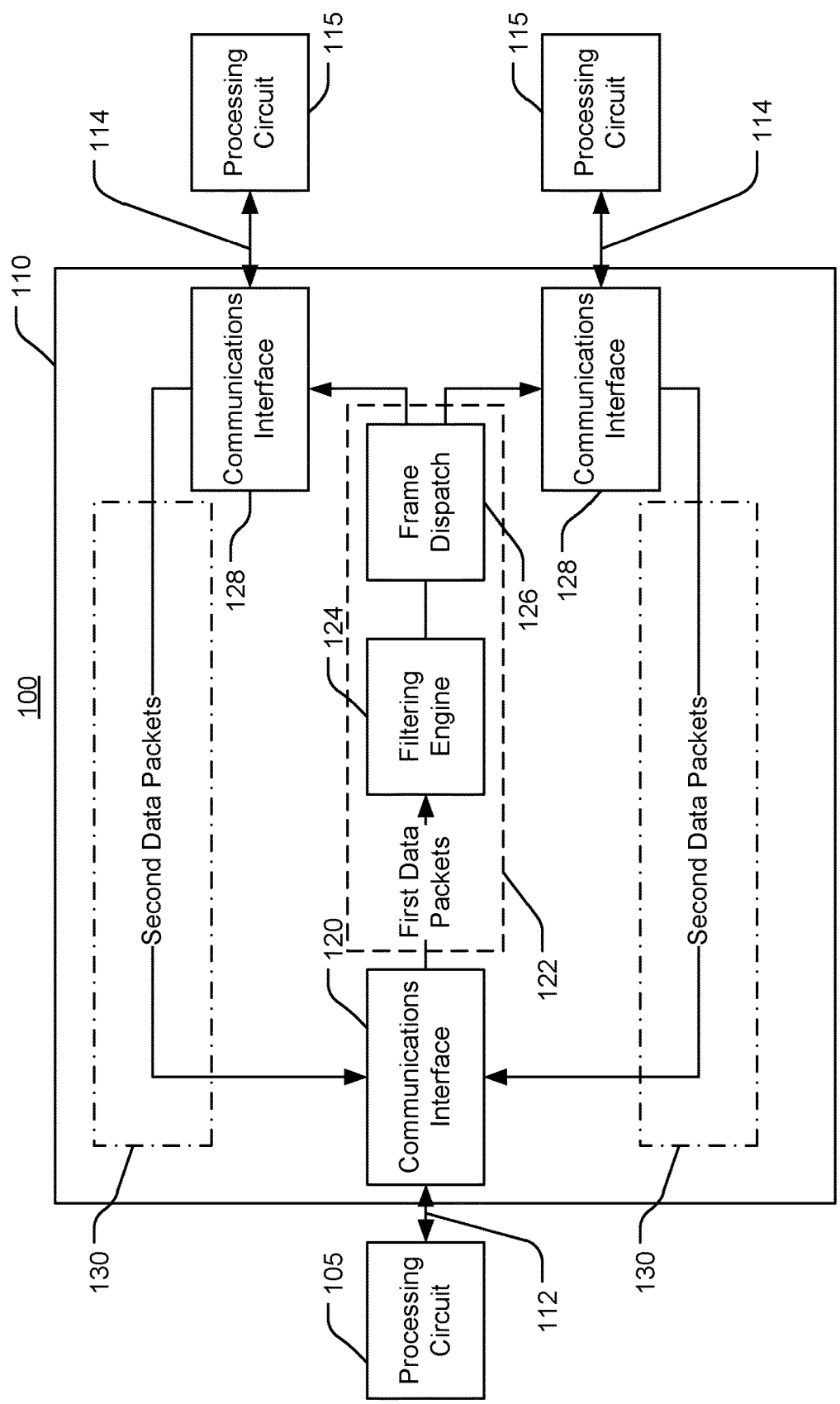
FIG. 1 is a block diagram of an exemplary embodiment of a system for implementing a secured maintenance gateway according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for a secured maintenance gateway, such as for protecting against security risks associated with Ethernet-based electronic communications on aircraft. The inventive concepts disclosed herein can be utilized in a number of control systems for various types of electronic avionics applications for airborne platforms (e.g., aircraft), including but not limited to flight control and autopilot systems, navigation systems, flight display systems, communications systems, radar systems, electric power systems, engine control systems, and monitor warning systems. While the present disclosure describes systems and methods implementable for an airborne platform, the inventive concepts disclosed herein may be used in any type of environment (e.g., in another aircraft, a spacecraft, an autonomous vehicle, a ground-based vehicle, a water-based or underwater vehicle, a subsurface or subterranean vehicle, a satellite, an aeronautical platform, or in a non-vehicle application such as a stationary communications, sensing, or testing system, a ground-based display system, an air traffic control system, a radar system, a virtual display system).

In some embodiments, a system includes a first processing circuit, a second processing circuit, and a network interface device. The network interface device includes a first communications interface, a second communications interface, and a filtering engine. The first communications interface is configured to receive first data packets from the first processing circuit and communicate the first data packets for transmission to the second processing circuit via a first network pathway. The second communications interface is configured to receive second data packets from the second processing circuit and communicate the second data packets to the first processing circuit via a second network pathway, which may be separated from the first network pathway. The filtering engine is configured to determine whether the first data packets satisfy an inspection criteria, and transmit the first data packets to the second processing circuit responsive to determining that the first data packets satisfy the inspection criteria.

The system can be integrated with an airborne platform or other platform as described herein. For example, the electronic security, filtering, and communication systems described herein can be associated with an aircraft cockpit display of the airborne platform.

Systems manufactured in accordance with the inventive concepts disclosed herein can improve the operation of aircraft and other platforms by allowing for the use of high-performance, high-speed Ethernet-based electronic communications, while preventing security risks from relatively low integrity electronic devices from affecting the operation of relatively high integrity electronic devices (including aircraft control devices, critical sensor systems, and maintenance terminals). In some embodiments, the inventive concepts disclosed herein can improve the operation of aircraft networking electronics by implementing a secure connection between low integrity electronic devices and high integrity electronic devices, which may be non-bypassable and non-replicable, such as by implementing the secure connection using a FPGA configured as described herein.

Referring now to FIG. 1, a block diagram of a system 100 is shown according to an exemplary embodiment of the inventive concepts disclosed herein. The system 100 can be used for secure Ethernet transmissions from relatively low integrity avionics systems to critical, high integrity devices, addressing security risks posed by existing Ethernet-based systems. Briefly, in some embodiments, the system 100 includes a first processing circuit 105, a network interface device 110, and one or more second processing circuits 115. In some embodiments, the system 100 is configured to utilize the network interface device 110 to selectively filter data packets transmitted by the first processing circuit 105 for communication to the one or more second processing circuits 115. While FIG. 1 illustrates the use of one first processing circuit 105 and two second processing circuits 115, it will be appreciated that any number of processing circuits 105 and/or 115 may be used with the inventive concepts disclosed herein.

Referring to FIG. 1 in more detail, in some embodiments, the first processing circuit 105 is a relatively low integrity system. The first processing circuit 105 may be associated with an aircraft cockpit or control center. The first processing circuit 105 may be configured to receive data transmissions from relatively low integrity sources, include various devices which may be connected to an aircraft's network, including but not limited to commercial off the shelf personal electronic devices.

The first processing circuit 105 is configured to generate first data packets. The first data packets may be associated with a relatively low integrity (e.g., untrusted data, fault- or error-prone data, unauthenticated data). In some embodiments, the first processing circuit 105 is associated with a first level of integrity which is less than a second level of integrity of the one or more second processing circuits 115, as will be described further herein.

The one or more second processing circuits 115 may include an avionics controller. The one or more second processing circuits 115 may be associated with relatively high integrity systems. For example, the one or more second processing circuits 115 may be associated with aircraft control functions, including but not limited to autopilot systems, autothrottle systems, engine control systems, sensor systems (e.g., sensors configured to detect flight critical states such as heading or attitude), secured communication systems, or flight display systems (e.g., primary flight displays configured to be used by a pilot and/or co-pilot). In some embodiments, the second processing circuit(s) 115 can be configured to cause the flight display system to display information based on first data packets transmitted from the filtering engine 124 to the second processing circuit(s) 115. It will be appreciated that operation of such electronic systems may require relatively high security and integrity to prevent security risks from affecting safe operation of aircraft. In some embodiments, the one or more second processing circuits 115 include or are configured to implement a full authority digital engine (FADEC), which may include an engine control unit (ECU) configured to control an engine of the aircraft. In some embodiments, the one or more second processing circuits 115 include a flight data interface management unit (FDIMU). The one or more processing circuits 115 can be configured to implement a maintenance terminal (e.g., a portable maintenance access terminal, PMAT), which may require high integrity to ensure safe usage by maintenance personnel, including restricting unauthorized tests from being executed on the maintenance terminal.

The first data packets may be transmitted by the first processing circuit 105 to the network interface device 110. In some embodiments, the first data packets are transmitted to the network interface device 110 using an Ethernet protocol. In some embodiments, the first processing circuit 105 is coupled to the network interface device 110 via a media-independent interface (MII) 112, such as a serial gigabit media-independent interface (SGMII).

The network interface device 110 includes a first communications interface 120, a filtering engine 124, and one or more second communications interfaces 128. The communications interfaces 120, 128 can be configured for bidirectional communication of data packets. The first communications interface 120 is configured to receive the first data packets from the first processing circuit 105, and communicate the first data packets for transmission to the one or more second processing circuits 115 via a first network pathway 122. The first communications interface 120 can also receive data packets (e.g., second data packets from second processing circuit(s) 115) for transmission to the first processing circuit 105. In some embodiments, the first communications interface 120 includes a media access control (MAC) interface. The first communications interface 120 may be configured to transmit the first data packets as an Ethernet frame (e.g., using an Ethernet-based protocol). The first communications interface 120 may be configured to transmit the first data packets using a user datagram protocol/trivial file transfer protocol (UDP/TFTP). The network interface device 110 can be configured for high performance (e.g., high speed, high throughput) through the use of Ethernet protocol-based communications as well as the use of the filtering engine 124 to ensure secure transmissions to high integrity second processing circuits 115.

The second communications interface(s) 128 can be similar to the first communication interface 120, and may each be associated with a corresponding second processing circuit 115. Each second communications interface 128 can be configured to receive second data packets from the corresponding second processing circuit 115, and transmit the second data packets (via a second network pathway 130) to the first communications interface 120, which may then transmit the second data packets to the first processing circuit 105. It will be appreciated that in various embodiments, the network interface device 110 may thus be configured such that second data packets may be transmitted in an uninhibited manner from the second processing circuit(s) 115 to the first processing circuit 105 (e.g., from high integrity electronics to low integrity electronics), whereas first data packets must be filtering by the filtering engine 124 in order to be transmitted from the first processing circuit 105 to the second processing circuit(s) 115 (e.g., from low integrity electronics to high integrity electronics). In some embodiments, the first network pathway 122 is physically separated from the second network pathway(s) 130—for example, on a physical layer of the network interface device 110, the second communications interface(s) 128 may be connected to the first communications interface 120 by a physical network connection (the second network pathway(s) 130), while a physical network connection from the first communications interface 120 to the second communications interface(s) 128 is separated from the second network pathway(s) 130 and requires the filtering engine 124.

In some embodiments, the first network pathway 122 includes the filtering engine 124. The filtering engine 124 can be configured to transmit the first data packets from the first processing circuit 105 to the one or more second processing circuits 115. The filtering engine 124 can be configured to determine whether to transmit the first data packets to the one or more second processing circuits 115 based on one or more policies, rules, heuristics, or other criteria, such as for selectively transmitting the first data packets. As such, in various embodiments, the filtering engine 124 can be configured to restrict transmission of unsecured data packets to the one or more second processing circuits 115 unless the data packets satisfy appropriate criteria.

In some embodiments, the filtering engine 124 is configured to transmit the first data packets to the one or more second processing circuits 115 responsive to determining that the first data packets satisfy (e.g., meet the requirements of) one or more inspection criteria. The filtering engine 124 may store inspection criteria (e.g., in a criteria database), retrieve the inspection criteria in response to receiving the first data packets, and execute an inspection of the first data packets based on the inspection criteria.

In some embodiments, the inspection criteria include criteria for executing a packet inspection (e.g., detailed packet inspection, deep packet inspection). For example, the filtering engine 124 can retrieve one or more rules indicating a requirement of at least one of a size, format, or content of the first data packets, compare the first data packets (e.g., a corresponding at least one of size, format, or content of the first data packets) to the one or more rules, and transmit the first data packets if the first data packets meet the requirements of the one or more rules. The filtering engine 124 can be configured to inspect at least one of a header or a data (e.g., payload) of the first data packets. The inspection criteria may include one or more criteria associated with evaluating at least one of a source address or a destination address of the first data packets. For example, the Ethernet network which the system 100 is connected to may implement static MAC configuration, in which case the filtering engine 124 can be configured to execute MAC address filtering to ensure that the source or destination of the first data packets is consistent with an expected source or destination (e.g., based on a known or predetermined configuration which may be stored in or retrieved by the filtering engine 124).

The network interface device 110 can be implemented on a field programmable gate array (FPGA) device. The FPGA may be at least one of physically or logically separated from the first processing circuit 105 and from the one or more second processing circuits 115, which may improve security of the system 100 by preventing a direct communication pathway between the first processing circuit 105 and the one or more second processing circuits 115. The filtering engine 124 can be implemented as a single-instance component (e.g., as opposed to chaining of multiple network devices), which may improve security of the system 100 by reducing the possibility of the filtering engine 124 being bypassed.

In some embodiments, the filtering engine 124 can be loaded on the network interface device 110 prior to connecting the network interface device 110 to the first processing circuit 105 and the one or more second processing circuits 115. For example, the filtering engine 124 can be loaded (e.g., programmed) during a factory installation. The filtering engine 124 can be programmed on the network interface device 110 using a dataloading process, such as a joint test action group (JTAG) process, which can enable strengthened security implementation. As such, in various embodiments, the filtering engine 124 is configured to be non-bypassable.

The filtering engine 124 may be configured to execute an integrity function to evaluate a configuration of the network interface device 110, which can enable the filtering engine 124 to ensure its own integrity (e.g., ensure integrity of the FPGA network interface device 110). The filtering engine 124 can be configured to store a configuration file, retrieve a configuration from the configuration file using the integrity function, compare a current configuration of the network interface device 110 (or components thereof) to the retrieved configuration, and determine whether the network interface device 110 satisfies the integrity function based on the comparison. The filtering engine 124 may be configured to execute the integrity function periodically (e.g., at regular intervals based on initiating and expiring a timer), or in response to a trigger condition (e.g., user input, an indication of a first data packet not satisfying inspection criteria, an indication of more than a threshold number of first data packets not satisfying inspection criteria over a predetermined duration of time). Executing the integrity function may include determining whether a test or sample data packet satisfies the inspection criteria, which may enable verification of the security and integrity of the filtering engine 124 itself.

In some embodiments, the filtering engine 124 is configured to output an indication of a success result or a failure result of the integrity function. If the integrity function succeeded (e.g., outputs a success result), the filtering engine 124 can be configured to operate normally (e.g., reset a timer for periodic execution of the integrity function; continue to inspect first data packets). If the integrity function failed (e.g., outputs a failure result) the filtering engine 124 can be configured to modify operation of the network interface device 110 to ensure safe operation of the system 100. For example, the filtering engine 124 can be configured to cause the first communications interface 120 to at least one of physically or logically disconnect the network interface device 110 from the first processing circuit 105. The filtering engine 124 can be configured to output a warning that the integrity function failed. The filtering engine 124 can be configured to store a log indicating failure of the integrity function. The filtering engine 124 can be configured to execute a fail-secure action, such as by shutting down the system 100.

In some embodiments, the filtering engine 124 is configured to communicate an action being performed by the filtering engine 124 (or other components of the network interface device 110). For example, the filtering engine 124 can output an indication of a function being executed, a data packet being inspected, a device (e.g., first processing circuit 105, second processing circuit 115) from which a data packet (e.g., most recent data packet) was received from or transmitted to, an inspection criteria being applied, or a report of recent inspections.

In some embodiments, the filtering engine 124 is configured to execute an address resolution protocol function to determine whether the first data packets satisfy the inspection criteria. For example, the filtering engine 124 can transmit an address request to one or more devices on the network to which the system 100 is connected (e.g., transmit to a device implementing the first processing circuit 105), and receive an indication of a result dat packet, such as an acknowledgement or a failure, from the devices. The filtering engine 124 can inspect the acknowledgement to confirm that the acknowledgement meets inspection criteria (e.g., size, address, format, content). The filtering engine 124 can be configured to determine an expected sequence number of the indication of the result data packet (e.g., based on a previous sequence number from the device), compare an actual sequence number of the indication of the result data packet to the expected sequence number, and determine the acknowledge to satisfy the inspection criteria if the actual sequence number corresponds to (e.g., is equal to, matches) the expected sequence number.

If the filtering engine 124 determines that the first data packets satisfy the inspection criteria, then the filtering engine 124 can transmit the first data packets to the one or more second processing circuits 115 from the first network pathway 122 via the second communications interface(s) 128. If the filtering engine 124 determines that the first data packets do not satisfy the inspection criteria, then the filtering engine 124 can output a warning, and/or transmit the first data packets to a drop destination (as will be described with further reference to FIGS. 2A-2B) rather than the one or more second processing circuits 115.

In some embodiments, the first network pathway 122 includes a frame dispatch 126. The frame dispatch 126 can be configured to receive the first data packets (which have been transmitted from the filtering engine 124 based on satisfying inspection criteria) and transmit the first data packets to an appropriate second processing circuit 115. The frame dispatch 126 may be configured to transmit the first data packets to the appropriate second processing circuit 115 based on a destination address included in the first data packets.

Figure 2A:
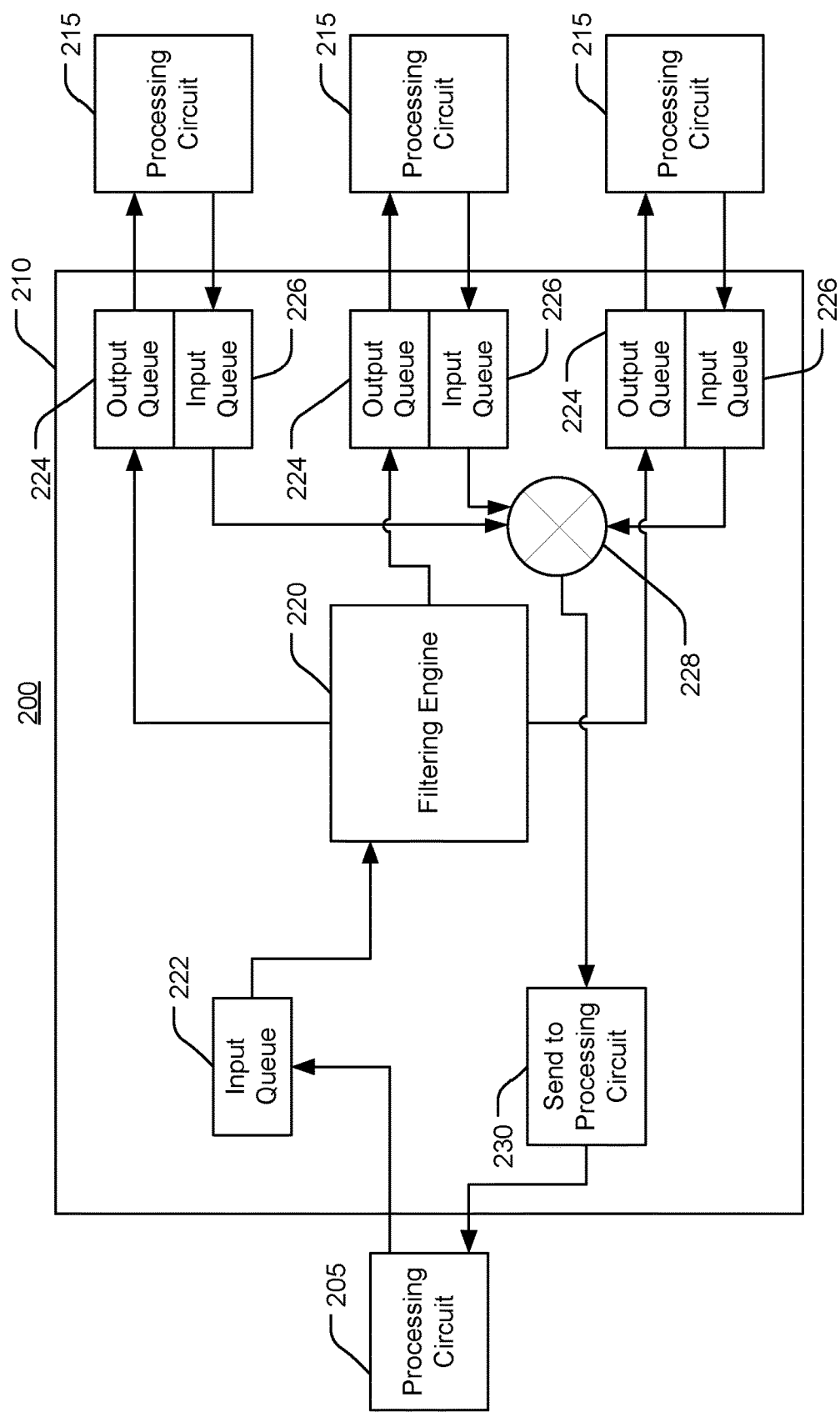
FIG. 2A is a block diagram of an exemplary embodiment of a system including a filtering engine for a secured maintenance gateway according to the inventive concepts disclosed herein.

Referring now to FIG. 2A, a block diagram of a system 200 is shown according to an exemplary embodiment of the inventive concepts disclosed herein. The system 200 may incorporate features of the system 100. Briefly, in some embodiments, the system 200 includes a first processing circuit 205 (which may be similar to the first processing circuit 105, such as by being associated with a relatively low integrity level), a network interface device 210, and one or more second processing circuits 215 (which may be similar to the one or more second processing circuits 115, such as by being associated with a relatively high integrity level). The network interface device 210 may be implemented on a FPGA device.

In some embodiments, the network interface device 210 includes a filtering engine 220. The filtering engine 220 is configured to receive first data packets from the first processing circuit 205 via an input queue 222. The filtering engine 220 is configured to determine whether to transmit the first data packets to the one or more second processing circuits 215, such as by enforcing one or more rules or other inspection criteria regarding properties of the first data packets. The filtering engine 220 can be configured to enforce inspection criteria as described with reference to filtering engine 124 of FIG. 1. The filtering engine 220 can be configured to enforce inspection criteria as will be described with reference to FIG. 2B below.

As shown in FIG. 2A, the filtering engine 220 is configured to transmit the first data packets to one or more output queues 224. The output queues 224 correspond to appropriate second processing circuits 215. The filtering engine 220 can be configured to identify a destination address of the first data packets and transmit the first data packets to the appropriate second processing circuit 215 based on the identified destination address. In some embodiments, the second processing circuit(s) 215 include at least one of an FADEC or an FDIMU. The second processing circuits 215 can transmit second data packets (for communication to the first processing circuit 205) via one or more corresponding input queues 226. A frame dispatch 228 can be configured to receive the second data packets from the input queues 226, and transmit the second data packets to the appropriate first processing circuit 205 via a send to processing circuit 230 (e.g., based on a destination address retrieved from the second data packets).

Figure 2B:
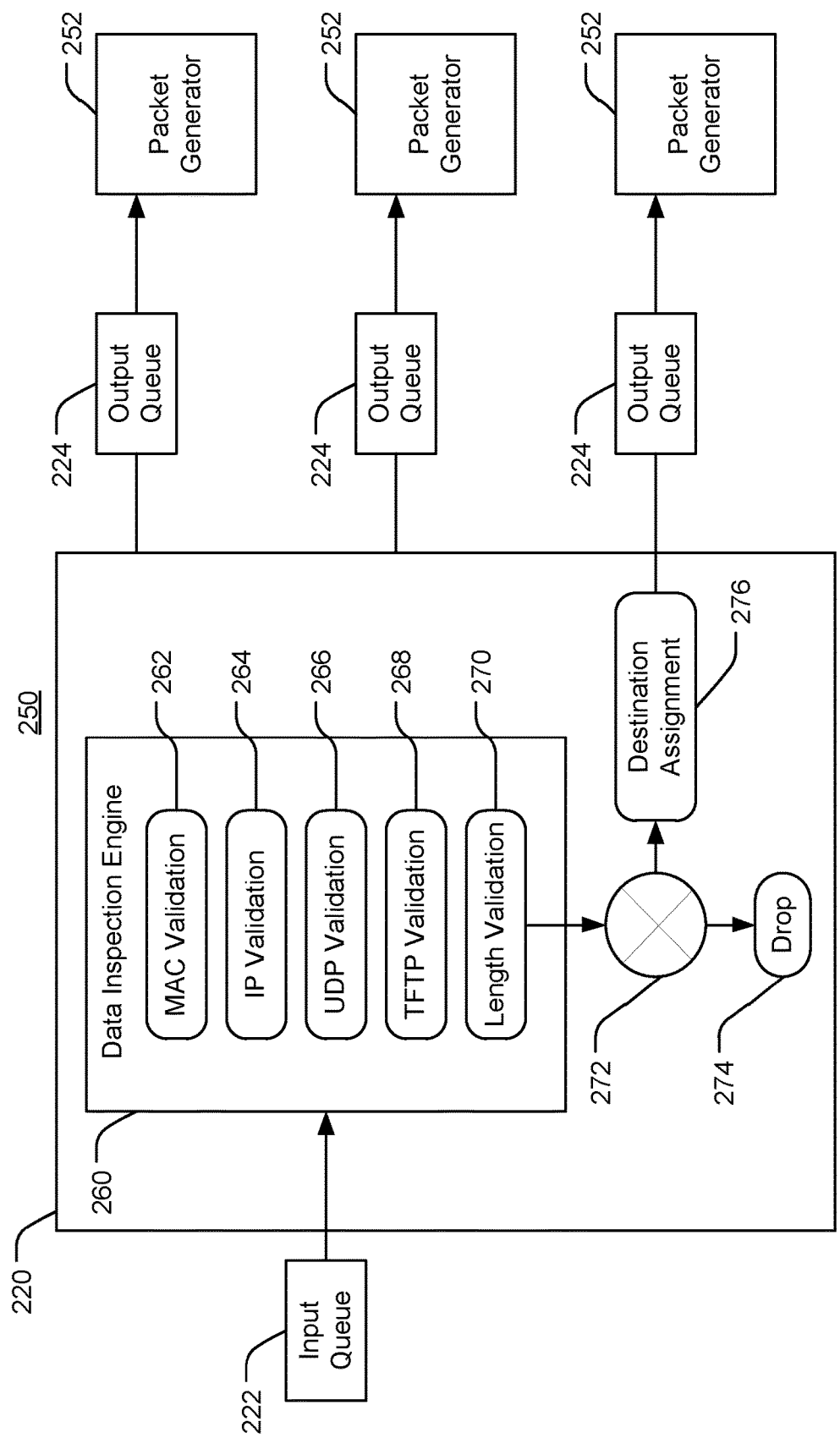
FIG. 2B is a block diagram of an exemplary embodiment of the filtering engine of FIG. 2A according to the inventive concepts disclosed herein.

Referring now to FIG. 2B, a block diagram of a system 250 including an implementation of the filtering engine 220 is shown according to an exemplary embodiment of the inventive concepts disclosed herein. The system 250 may incorporate features of the system 200. The system 250 can include the filtering engine 220, the input queue 222 for providing first data packets to the filtering engine 220, and output queues 224 for queuing the first data packets for transmission to second processing circuits (e.g., second processing circuits 215). As shown in FIG. 2B, the output queues 224 may be configured to transmit the first data packets (or the contents thereof) to corresponding packet generator(s) 252. The packet generator(s) 252 can be configured to configured to modify the first data packets (or generate new data packets based on the contents for the first data packets) according to appropriate protocols for transmission to appropriate second processing circuits.

In some embodiments, the filtering engine 220 includes a data inspection engine 260. The data inspection engine 260 can be configured to execute one or more inspection functions for determining whether first data packets may be transmitted to one or more second processing circuits 215 if the first data packets satisfy inspection criteria of the inspection functions, or otherwise eliminated (e.g., transmitted to drop 280) if the first data packets do not satisfy the inspection criteria. The data inspection engine 260 can be configured to execute a MAC validation function 262, which can allow for inspection based on at least one of a MAC address (e.g., destination or source address), a size filter (e.g., to eliminate packets having an Ethernet frame length greater than a threshold frame length, such as 1500 bytes, such as to eliminate jumbo frames where the system 250 is not configured for jumbo frame communication).

The data inspection engine 260 can be configured to execute an IP validation function 264, which can allow for IP layer inspection, such as by validating an IP address of a destination or source of the first data packets (e.g., based on static IP addresses being assigned on a port basis). The data inspection engine 260 can be configured to execute a UDP validation function 266, which can allow for UDP layer inspection, including validation of at least one of a source port or a destination port of the first data packets. The data inspection engine 260 can be configured to execute a TFTP validation function 268, which can allow for TFTP layer inspection, including determining whether the contents of the first data packets are organized into appropriate blocks (e.g., acknowledgement is received with the correct block number), or inspection of error packets of the first data packets. The data inspection engine 260 can be configured to execute a length validation function 270, such as to transmit first data packets to second processing circuits if a length of the first data packets (e.g., Ethernet frame length) is at least one of greater than a first length threshold or less than a second length threshold.

Based on execution of one or more of the data validation functions 262-270, the data inspection engine 260 can transmit the first data packets to a drop 274 or destination assignment 276 (e.g., via frame dispatch 272). For example, the data inspection engine 260 can generate an indication of a result of the executed data inspection (e.g., an indication of a success result or a failure result), and transmit the first data packets to the drop 274 or the destination assignment 276 based on the indication of the result. The destination engine 276 can transmit the first data packets to the appropriate output queue 224 (corresponding to the appropriate second processing circuit) based on a destination address of the first data packets.

Figure 3:
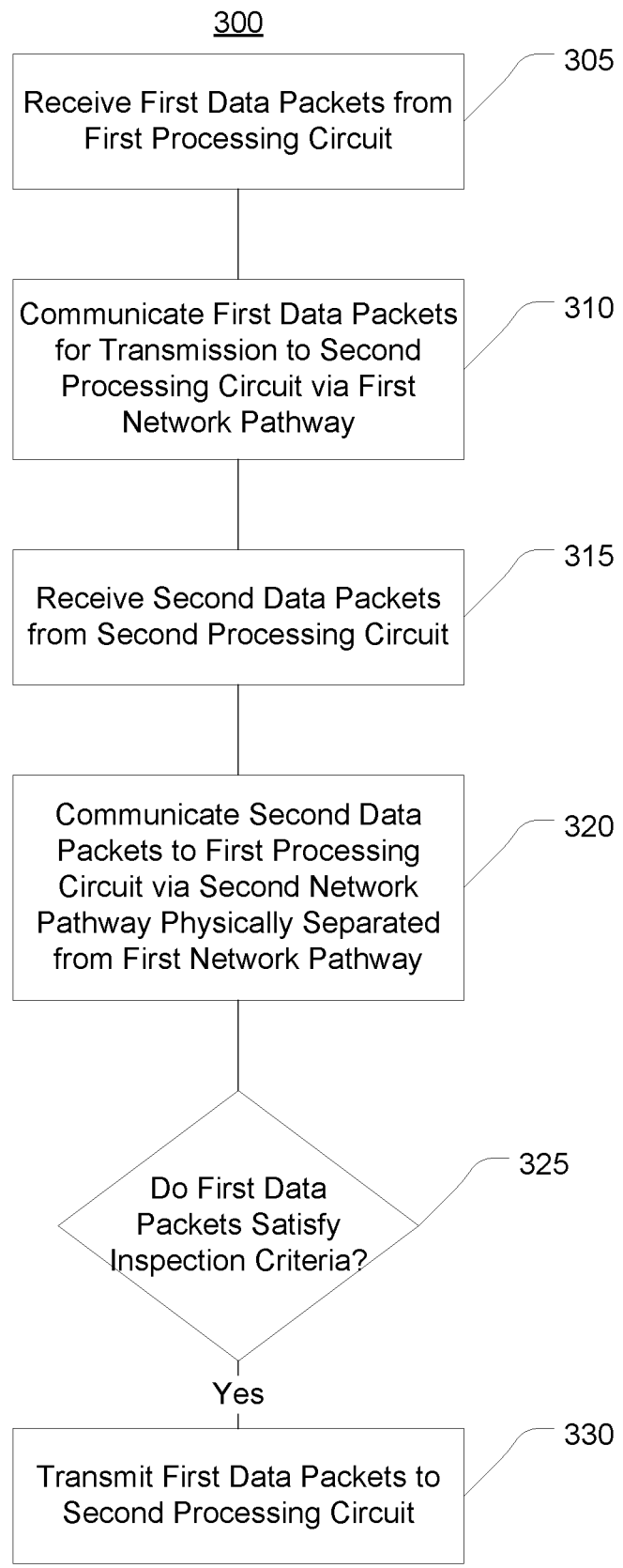
FIG. 3 is a diagram of an exemplary embodiment of a method for a secured maintenance gateway according to the inventive concepts disclosed herein.

Referring now to FIG. 3, an exemplary embodiment of a method 300 according to the inventive concepts disclosed herein may include the following steps. The method 300 may be executed using various hardware, apparatuses, and systems disclosed herein, such as the systems 100, 200, 250, and/or components thereof.

A step (305) may include receiving, at a first communications interface of a network interface device, first data packets from a first processing circuit. The first processing circuit may be associated with a relatively low integrity (e.g., may be an untrusted device). The first communications interface may include a MAC interface.

A step (310) may include communicating, by the first communications interface, the first data packets for transmission to a second processing circuit via a first network pathway. The first communications interface may be configured to communicate the first data packets according to an Ethernet-based protocol.

A step (315) may include receiving, at a second communications interface of the network interface device, second data packets from the second processing circuit. The second communications interface may be similar to the first communications interface. The second processing circuit may be associated with a relatively high integrity (e.g., may be a trusted device; may be configured to control aircraft operations such as engine operations; may be configured to detect flight critical states such as heading or attitude). The network interface device may be at least one of physically or logically separated from the first processing circuit and the second processing circuit.

A step (320) may include communicating the second data packets to the first processing circuit via a second network pathway physically separated from the first network pathway. A step (325) may include determining, by a filtering engine of the first network pathway, whether the first data packets satisfy an inspection criteria. The first network pathway may include an Ethernet connection coupling the first communications interface to the filtering engine, and the second network pathway may include a second Ethernet connection coupling the second communications interface to the first communications interface. In some embodiments, determining whether the first data packets satisfy the inspection criteria includes executing a detailed packet inspection.

A step (325) may include transmitting, by the filtering engine, the first data packets from the filtering engine to the second processing circuit responsive to determining that the first data packets satisfy the inspection criteria.

As will be appreciated from the above, systems and methods for a secured maintenance gateway and other secured avionics electronics according to embodiments of the inventive concepts disclosed herein may improve operation of aircraft and other platforms by allowing for the use of high performance, high speed bi-directional Ethernet connections in an environment where relatively high integrity avionics electronics may be required to access the same Ethernet-based network as relatively low integrity avionics electronics, restricting security risks associated with the relatively low integrity avionics electronics from affecting the security of the relatively high integrity avionics electronics.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   a first processing circuit configured to generate first data packets associated with a low integrity data source on an aircraft;
   a second processing circuit configured to generate second data packets associated with a high integrity data source on the aircraft; and
   a network interface device including:
   a first communications interface configured to receive the first data packets from the first processing circuit and communicate the first data packets for transmission to the second processing circuit via a first network pathway;
   a second communications interface configured to receive the second data packets from the second processing circuit and communicate the second data packets to the first processing circuit via a second network pathway physically separated from the first network pathway; and
   a filtering engine of the first network pathway, the filtering engine configured to determine whether the first data packets satisfy an inspection criteria by executing an address resolution protocol function, the address resolution protocol function including confirming an acknowledgement from the first processing circuit satisfies the inspection criteria, the filtering engine configured to transmit the first data packets to the second processing circuit responsive to determining that the first data packets satisfy the inspection criteria, the filtering engine comprising an integrity function configured to evaluate a configuration of the network interface device,
   wherein the filtering engine is configured to store and retrieve a configuration file, compare a current configuration of the network interface device to the retrieved configuration from the configuration file, and determine whether the network interface device satisfies the integrity function based on the comparison.

2. The system of claim 1, wherein the first network pathway includes a first Ethernet connection coupling the first communications interface to the filtering engine, and the second network pathway includes a second Ethernet connection coupling the second communications interface to the first communications interface.

3. The system of claim 1, wherein the first processing circuit is associated with a first level of integrity, the second processing circuit is associated with a second level of integrity, and the first level of integrity is less than the second level of integrity.

4. The system of claim 1, wherein the filtering engine is configured to execute a detailed packet inspection to determine whether the first data packets satisfy the inspection criteria.

5. The system of claim 1, wherein the filtering engine stores a set of rules associated with at least one of a format or a content of data packets, and the filtering engine is configured to determine a corresponding at least one first format or content of the first data packets and determine that the first data packets satisfy the inspection criteria based on the at least one first format or content of the first data packets complying with the set of rules.

6. The system of claim 1, wherein the network interface device is implemented on a field programmable gate array device, the field programmable gate array device at least one of physically or logically separated from the first processing circuit and the second processing circuit.

7. The system of claim 1, wherein the second data packets are associated with aircraft control functions.

8. The system of claim 1, wherein the network interface device is configured by dataloading prior to connecting the network interface device to the first processing circuit and the second processing circuit.

9. The system of claim 1, wherein the inspection criteria is associated with an indication of a result received from the first processing circuit.

10. The system of claim 1, wherein the network interface device is configured to communicate an action being performed by the network interface device.

11. An airborne platform, comprising:
   a first avionics system including a first processing circuit configured to generate first data packets with a low integrity;
   an avionics controller including a second processing circuit configured to generate second data packets with a high integrity; and
   a network interface device including:
   a first communications interface configured to receive the first data packets from the first processing circuit and communicate the first data packets for transmission to the second processing circuit via a first network pathway;

a second communications interface configured to receive the second data packets from the second processing circuit and communicate the second data packets to the first processing circuit via a second network pathway physically separated from the first network pathway; and a filtering engine of the first network pathway, the filtering engine configured to determine whether the first data packets satisfy an inspection criteria by executing an address resolution protocol function, the address resolution protocol function including confirming an acknowledgement from the first processing circuit satisfies the inspection criteria, the filtering engine configured to transmit the first data packets to the second processing circuit responsive to determining that the first data packets satisfy the inspection criteria, the filtering engine comprising an integrity function configured to evaluate a configuration of the network interface device, wherein the filtering engine is configured to store and retrieve a configuration file, compare a current configuration of the network interface device to the retrieved configuration fie, and determine whether the network interface device satisfies the integrity function based on the comparison.

12. The airborne platform of claim 11, wherein the second processing circuit includes a full authority digital engine including an engine control unit configured to control an engine of the airborne platform.

13. The airborne platform of claim 11, further comprising a second avionics system including a third processing circuit including a flight data interface management unit.

14. The airborne platform of claim 13, wherein the second avionics system includes a flight display, and the second processing circuit is configured to cause the flight display to display information based on first data packets transmitted from the filtering engine to the second processing circuit.

15. The airborne platform of claim 11, wherein the first network pathway includes a first Ethernet connection coupling the first communications interface to the filtering engine, and the second network pathway includes a second Ethernet connection coupling the second communications interface to the first communications interface.

16. A method, comprising:

receiving, at a first communications interface of a network interface device, first data packets from a first processing circuit associated with a low integrity data source on an aircraft;

communicating, by the first communications interface, the first data packets for transmission to a second processing circuit via a first network pathway, the second processing circuit associated with a high integrity data source on an aircraft;

receiving, at the second communications interface, second data packets from the second processing circuit;

communicating the second data packets to the first processing circuit via a second network pathway physically separated from the first network pathway;

determining, by a filtering engine of the first network pathway, whether the first data packets satisfy an inspection criteria by executing an address resolution protocol function, the address resolution protocol function including confirming an acknowledgement from the first processing circuit satisfies the inspection criteria;

transmitting, by the filtering engine, the first data packets from the filtering engine to the second processing circuit responsive to determining that the first data packets satisfy the inspection criteria; and evaluating, by an integrity function of the filtering engine, a configuration of the network interface device, wherein the filtering engine is configured to store and retrieve a configuration file, compare a current configuration of the network interface device to the retrieved configuration file, and determine whether the network interface device satisfies the integrity function based on the comparison.

17. The method of claim 16, wherein the first network pathway includes a first Ethernet connection coupling the first communications interface to the filtering engine, and the second network pathway includes a second Ethernet connection coupling the second communications interface to the first communications interface.

18. The method of claim 16, wherein the first processing circuit is associated with a first level of integrity, the second processing circuit is associated with a second level of integrity, and the first level of integrity is less than the second level of integrity.

19. The method of claim 16, wherein determining whether the first data packets satisfy the inspection criteria includes executing a detailed packet inspection.

* * * * *